United States Patent [19]
Sather

[11] Patent Number: 5,603,403
[45] Date of Patent: Feb. 18, 1997

[54] FIXTURE TO STACK DOORS

[76] Inventor: Greg A. Sather, P.O. Box 2225, Bigfork, Mo. 59911

[21] Appl. No.: 596,673

[22] Filed: Feb. 5, 1996

[51] Int. Cl.$^6$ ................................................. B65D 85/62
[52] U.S. Cl. ............................ 206/325; 206/453; 206/821
[58] Field of Search ..................................... 206/321, 325, 206/449, 453, 821, 526

[56] References Cited

U.S. PATENT DOCUMENTS

| | | | |
|---|---|---|---|
| 2,198,106 | 4/1940 | Chandonia | 53/6 |
| 2,738,564 | 3/1956 | Guinane | 25/153 |
| 3,194,396 | 7/1965 | Mock | 206/60 |
| 3,593,861 | 7/1971 | Holland, Jr. | 214/10.5 R |
| 3,814,489 | 6/1974 | Clark et al. | 312/111 |
| 4,619,365 | 10/1986 | Kelly et al. | 206/503 |
| 4,807,756 | 2/1989 | Young et al. | 206/821 |
| 4,984,690 | 1/1991 | King | 206/503 |
| 5,054,613 | 10/1991 | Johansson | 206/325 |
| 5,207,252 | 5/1993 | Risse | 144/84 |

Primary Examiner—Paul T. Sewell
Assistant Examiner—Luan K. Bui
Attorney, Agent, or Firm—Keith S. Bergman

[57] ABSTRACT

An elongate fixture fastenable in pairs on the top and bottom edges of a door allows spaced vertical stacking of a plurality of horizontally orientated doors similarly equipped. The fixture provides an elongate generally rectangular body with two spaced handles on its outer face and four spaced door contacting feet on its inner face to contact a door fastened thereto by screws extending through the fixture and into the door. A first longer horizontally orientated side edge carries two spaced outwardly extending tenons and the opposed second longer side edge defines two similar cooperating mortises to receive the tenons of an adjacent fixture. The end portion of the fixture are wider between the longer side edges than the width of a serviced door, and no portion of the fixture extends over any door surface, except the top or bottom edges, to allow stacking of doors during surface finishing operations.

3 Claims, 1 Drawing Sheet

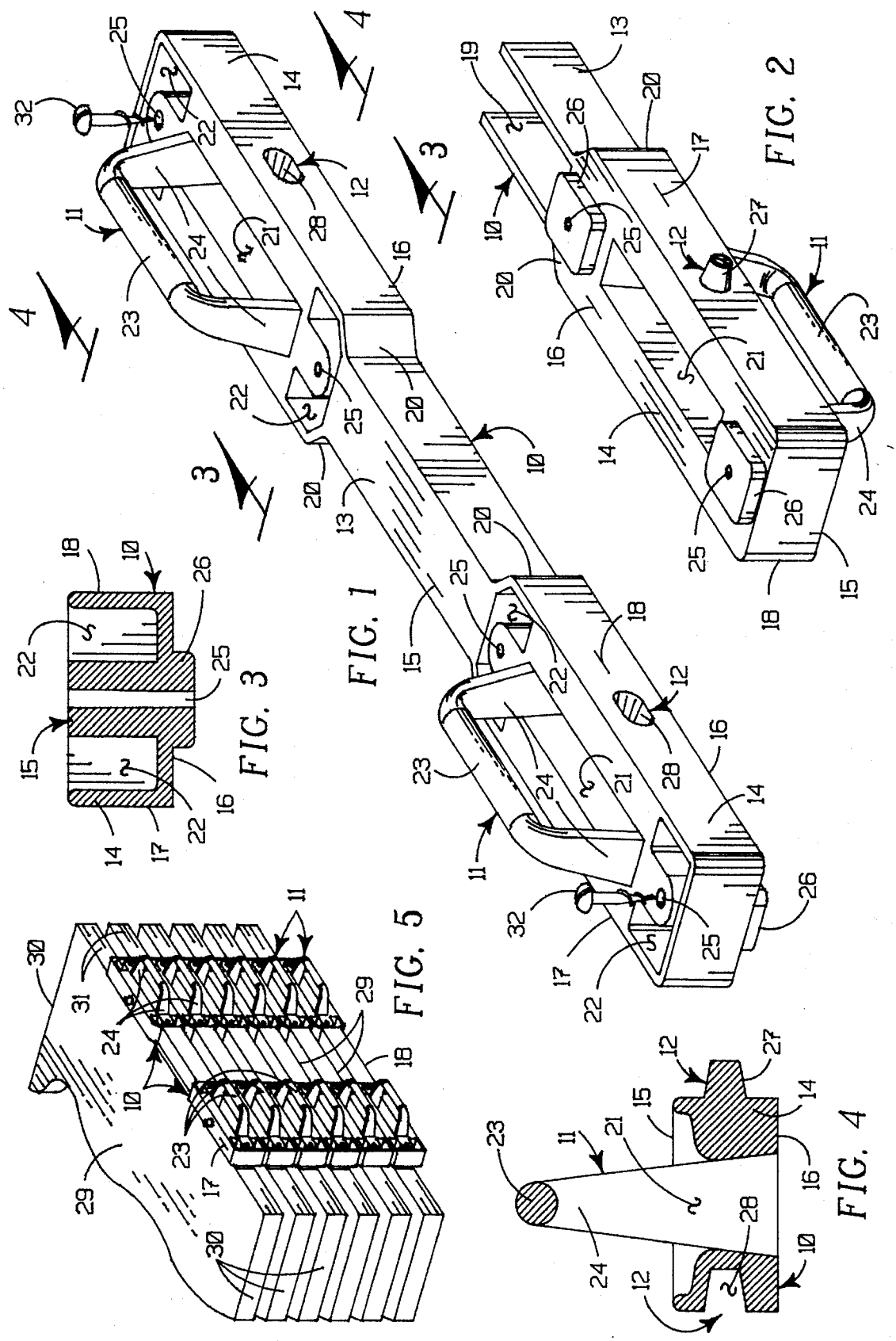

FIXTURE TO STACK DOORS

BACKGROUND OF INVENTION

1. Related Applications

There are no applications related hereto heretofore filed in this or any foreign country.

2. Field of Invention

This invention relates generally to work supported fixtures for stacking horizontally orientated doors in spaced vertical array, and more particularly to such a fixture having two spaced handles for manipulation and self-aligning mortise and tenon joining elements.

3. Background and Description of Prior Art

In the construction industry generally and in new construction particularly it often is necessary to finish exposed surfaces of a substantial number of unhung doors by painting, varnishing or otherwise. Such finishing process generally heretofore has been carried out by resting single doors on some horizontal supportative surface such as two sawhorses or on an underlying support such as a floor adjacent a wall on which the upper portion of a door is rested in angulated fashion. Normally in this process, only one side of a door is finished at one time because of the difficulty of moving the door after finishing material is applied on one side without damaging the unmatured finish on that side. This type of door finishing not only requires the expenditures of substantial time and labor, but also exposes a recently finished door before drying or maturity of the finishing material to the hazards of a construction environment, such as dust, air borne debris and the like, and generally occupies substantial areas of a construction project for substantial periods of time during which the door finishing process is carried out. The instant invention seeks to alleviate this problem by providing fixtures which may be attached in pairs on both the top and bottom edges of doors to allow handling and vertical stacking of a plurality of horizontally orientated doors not only for finishing, but also for other work, storage, or otherwise.

It has heretofore become known, especially in the packaging arts, to support a plurality of relatively thin, substantially planar, door-like items in spaced parallel array, especially for shipping or storage, and various support devices have heretofore become known for this purpose. Such devices generally have been developed to support particular items and by reason of this have been specifically related and limited in use to the particular items which they support, both in their structural design and function. Packaging or storage supports of this type are not concerned with supporting items that have unfinished surfaces coated with wet paint or similar finishing material and because of this such supports commonly have extended over one or both faces of the arrayed material. Over two or more perpendicularly related peripheral surfaces, or both. Corner type supports that fit over two spaced parallel surfaces and two perpendicular edges connecting those surfaces and U-shaped supports that fit over two perpendicular surfaces and one edge connecting the surfaces are typical of this type of packaging support. Commonly such packing supports are not interconnected to the material which they are associated and they usually have no means for aligning a stacked array of protected objects in spaced adjacency as this function is accomplished by other packaging material. The instant fixture differs from this type of packaging support by providing a fixture that is mechanically fastened to the top and bottom edges of a door to be stacked, provides two spaced handles to aid manipulation and spaced tenons on one side edge and mortises on the opposite side edge to cooperate with similar elements of adjacent fixtures to not only maintain a spaced relationship between a plurality of stacked doors but also to positionally maintain the stacked array.

Another type of support for a spacedly adjacent array of relatively thin flat objects has required some particular configuration or configurational modification in the arrayed objects themselves to fasten to those objects. Commonly such structures have served a secondary purpose of interconnecting various parts of the objects to be arrayed, such as a corner support that fits in slots defined in two perpendicular sides of an object or a multiple spline-like structure that fits in appropriately configured tenons defined in adjacent surfaces of the objects to be arrayed. In contradistinction, the instant fixture requires no modification or change in the configuration of doors to be stacked for its use and it does not require any fastening structures that disfigure any of the observable areas of doors which it services as it is interconnected only to the top and bottom edges of doors which are not normally visually observable when the doors are hung in a supporting casement.

My door stacking fixture provides other secondary advantages that are related to its particular use in the stacking of doors: during finishing operations. The fixture allows doors to be stacked in a substantially horizontal orientation on a horizontal supporting surface such as a floor so that the upper surface of the uppermost door in a stack may be accessed and worked upon while supported in the stack. This allows finishing of both faces or major areal surfaces of the door and its side edges at the same time since a downwardly facing finished surface is maintained at a spaced distance from the immediately lower door supported by my fixture. If doors are finished with material applied by spraying, a door may be finished at a distance from the array in which it is to be stacked and then subsequently stacked in the array after finishing to avoid over-spray on doors already in the array. Normally the bottom and top edges of doors are not finished, but if this be desired, the fixture may be removed after finishing and curing of the finish on the door surfaces and the top and bottom surfaces then finished while the door is otherwise supported then by my fixtures, such as in a stack with faces in adjacency. Various door hardware such as hinges, knobs, and latches may be easily and conveniently initially installed or later replaced on doors, and especially the uppermost door, while supported in a stacked array.

Another secondary benefit provided by the instant fixture is that stacked doors are maintained in a compact spaced array with channels between the adjacent surfaces of each door and the surface supporting the lowermost door to allow circulation of air to aid in the drying or curing process of finishing materials that are applied to the door faces. A stacked array of doors with relatively narrow channels between adjacent door surfaces also tends to keep more aerial borne debris, such as dust or other similar particulate matter common in construction sites, from accessing the finished surfaces of the doors, at least to a substantially greater extent than if the doors were individually supported on horizontal supports or in an angulated fashion between a floor and vertical structural wall. The compact vertically stacked array of doors also provides a volume which may be easily covered with a tarp or sheet of other protective material that may be supported on the outer surfaces of my fixtures to maintain it out of contact with the door surfaces.

My invention resides not in any one of these features individually, but rather in the synergistic combination of all of the structures of my fixture that combine to give rise to the functions that necessarily flow therefrom.

SUMMARY

My fixture provides an elongate body having a medial portion interconnecting two similar end portions. In horizontally extending operative position the end fastening portions have a vertical width somewhat greater than the thickness of doors to be stacked to maintain stacked doors in spaced relationship. Each end portion of the body carries a vertically medial handle that extends horizontally outwardly away from the outer face of the body and two spacedly adjacent fastening feet that extend spacedly inwardly away from the inner face of the body to contact a door edge. Holes are defined through the end portions of the body to receive screws therethrough to fasten the fixture to a top or bottom edge of a door. Each upper edge of each end portion of the body defines an elongate mortise extending vertically parallel to the body to accept a truncated conic tenon of a second fixture, and the lower edge of each end portion defines a depending truncated conic tenon to fit within a mortise of a vertically adjacent fixture, with the mortises and tenons positioned to substantially align a group of vertically stacked fixtures.

One such fixture is fastened to the top edge and another to the bottom edge of each door to be stacked by screws passing through the holes defined in the end portions of the body and into fastenable engagement with the door.

In providing such a device, it is:

A principal object to create an elongate fixture which may be attached in pairs to the top and bottom edges of an unhung door to aid manipulation and allow vertical stacking in spaced array of a plurality of horizontally orientated doors having the fixtures.

A further object is to provide such a fixture that has two spaced handles to aid manipulation of a door to which the fixture is attached, especially during a finishing process when various surfaces of the door may not be contacted without damaging a newly finished surface.

A still further object is to provide such a fixture that has a plurality of spaced fastening feet on its inner surface to aid secure fastening by reason of the smaller areal contact of the feet with a serviced door than would result by contact of the entire adjacent surface of the fixture with the door.

A still further object is to provide such a fixture that defines elongate mortises in its upper longer edge and depending tenons in its lower longer edge so as to align vertically adjacent fixtures.

A further object is to provide such a fixture that fits immediately adjacent only portions of the top and bottom edges of a door so that all other surfaces may be finished and the door supported in stacked array to allow finish maturity without damage to normally finished surfaces.

A still further object is to provide such a fixture that may be formed by molding resinous or polymeric plastic materials.

A still further object is to provide such a fixture that is of new and novel design, of rugged and durable nature, of simple and economic manufacture and otherwise well adapted to the uses and purposes for which it is intended.

Other and further objects of my invention will appear from the following specification and accompanying drawings which form a part hereof. In carrying out the objects of my invention, however, it is to be remembered that its accidental features are susceptible of change in design and structural arrangement with only the preferred and practical embodiment of the best known mode being illustrated and specified as is required.

BRIEF DESCRIPTION OF DRAWINGS

In the accompanying drawings which form a part hereof and wherein like numbers of reference refer to similar parts throughout:

FIG. 1 is an isometric surface view of the face or outer surface of my fixture showing various of its parts, their configuration and relationship.

FIG. 2 is a partial isometric view of the back or inner surface of the left end portion of the fixture of FIG. 1 showing its elements from this aspect.

FIG. 3 is a transverse vertical cross-sectional view through the right end portion of the fixture of FIG. 1, taken on the line 3—3 thereon in the direction indicated by the arrows.

FIG. 4 is a transverse vertical cross-sectional view through another part of the right end portion of the fixture of FIG. 1, taken on the line 4—4 thereon in the direction indicated by the arrows.

FIG. 5 is a partially cut-away isometric surface view of one end of a vertically stacked array of a plurality of horizontally orientated doors supported by my fixtures.

DESCRIPTION OF PREFERRED EMBODIMENT

My door stacking fixture generally provides elongate body 10 carrying handles 11 and defining aligning fasteners 12 in both end portions of the body. Subsequent references to "inner" and "outer" and "upper" and "lower surfaces", and to "horizontal" and "vertical" are used with reference to the normal operative positioning of my fixture on a horizontally orientated door, as illustrated in FIG. 5.

Body 10 is a flat elongate structure having in operative position a vertical width greater than its horizontal thickness and providing medial portion 13 interconnecting two similar end portions 14 that are mirror images of each other. The thickness of the body between outer surface 15 and inner surface 16 is substantially uniform throughout, though the body width or the distance between upper surface 17 and lower surface 18 is greater in the end portions than in the medial portion. Because of the difference in width, the upper and lower edges of the medial portion 13 are connected to the upper and lower edges of each end portion 14 by angulated transition edges 20. The inner surface of medial portion 13 defines medial indentation 19 in the instant illustrated to aid formation of the body by molding plastic, though this indentation is not necessary to my invention. End portions 14 of the body have a width or vertical dimension somewhat greater than the thickness or distance between faces of a door to be stacked thereby so that the door when stacked will remain spacedly distant from the face of an adjacent door on either side thereof. Each end portion 14 defines a medial elongate handle slot 21, extending therethrough in the instance illustrated, to aid formation by molding of polymeric material, and it also defines two U-shaped slots 22 spacedly adjacent each end of the handle slot for the same purpose, though neither of these slots are necessary to my fixture. Handle 23, carried by similar paired opposed end supports 24 at each end of handle slot 21, extends horizontally outwardly from the outer surface of each end portion of the body sufficiently to allow manual grasping and manipulation of the handle. Plural fastening holes 25 are defined through the end portion of the body spacedly distant from each handle end support to extend between the inner and outer surfaces 16, 15 to accept headed screws 32 to fasten the body to the edges of a door to be serviced by the fixture.

As seen in FIG. 2, the inner surface of end portion 14 carries rectilinear fastening feet 26 extending spacedly about each fastening hole 25. These fastening feet extend spacedly inwardly from the inner surface 16 of the end portion 14 of the body to provide a contact surface on the edge of a door that has a lesser area than the inner surface of the entire body 10 to better accomplish a fastening and support function where there may be irregularities in either my fixture or the top or bottom edges of a door to which the fixture is fastened. Preferably fastening holes 25 are defined so as to be medially positioned in a fastening foot 26.

Aligning fasteners 12 provide two similar tenons 27 carried by the medial portion of the upper edge 17 of each body end portion 14. In the instance illustrated, these tenons 27 are configured as truncated conics, but this shape is not essential so long as the tenons interfit with cooperating mortises. The medial lower edge 18 of each end portion 14 of the body defines laterally elongate mortise 28, in the instance illustrated with an inwardly tapering shape to receive the tenon 27 of an adjacent fixture in a reasonably conformal fit. The mortises 28 are somewhat elongate in a direction parallel to the longer dimension of the body to accommodate any irregularities in the positioning of adjacent fixtures or in the fixtures themselves to aid in creating an operative fit between adjacent cooperating mortises and tenons.

The form of fixture illustrated is designed for formation by molding from resinous or polymeric plastic materials and such materials are generally preferred for the formation of my fixture because they provide appropriate rigidity and durability at a relatively low cost, though they are not essential to it. The fixture may be formed from other rigid materials of appropriate physical characteristics, especially such as metals, and those materials are within the scope of my invention.

The particular configuration and absolute dimensioning of the various elements of my fixture are not essential and variances in these parameters remain within the scope of my invention so long as the relationship between the various elements is maintained as specified. The lateral length of the fixture preferably is less than the length of the bottom or top edges of doors to be stacked, but it must be such as to position the fastening holes 25 within the length of the top and bottom edges of doors to be serviced. The width or vertical dimension between upper side 17 and lower side 18 must be greater than the width of doors to be serviced so that those doors may be stacked in spaced adjacency. Preferably this width is at least one-third greater than the width of a serviced door, though this preferred dimensioning is not essential.

Having described the structure of my fixture, its use may be understood.

Firstly, a number of fixtures sufficient to provide two fixtures for each door 29 to be stacked are formed according to the foregoing specification. Each door 29 has similar side edges 30 and top and bottom edges 31. One of my fixtures is fastened in a medial symmetrical position on each top and bottom edge 31 of a door by mechanical fasteners, preferably headed screws 32 that pass from the outer surface 15 of the fixture through fastening holes 25 and into fastenable engagement with top and bottom edges 31 of the door.

In its fastened state, the fixture must be in a reasonably symmetrical position between the faces of a door on the top and bottom edges to maintain adjacent doors in spaced relationship by reason of the greater width or vertical dimension of the end portions of the fastener than the end edges of the attached door. Normally the fixture should also be reasonably symmetrically positioned horizontally relative to the door so that a stacked array of doors is substantially vertically related. This positioning of the fixture may be accomplished by visual observation, by measurement of the positions of the fastening holes of the fixture on the door and establishing guide holes for screws, or by the use of various known fixtures and jigs. It normally is easier to fasten my fixture if guide holes for screws are predrilled in the top and bottom edges of a door to be attached, but this is not necessary except possibly in hardwood materials.

With my fixture established on each top and bottom edge of a door, the door may be manipulated by use of the handles 23 and may also be rested on those handles to maintain it in spaced adjacency from a supporting surface, especially such as when supported in angulated fashion on a floor and an intersecting vertical structural wall. More importantly, however, a plurality of doors having my fixtures may be stacked, as illustrated in FIG. 5.

To accomplish door stacking, the lowermost door is positioned in horizontal orientation on some supporting surface such as a floor, where it is maintained spacedly above the supporting surface by reason of the projection of the lower surface 18 of the end portions of the fixture body below the lower door face. A second door carrying my fixtures then is placed above the first door and the fixtures positioned above the fixtures carried by the first door so that connectors 12 between adjacent surfaces of the doors are aligned, and the door is lowered until those connectors come into interconnecting relationship with each other. The process is then continued until a stack of doors of desired height is created.

It is to be noted from the foregoing description that no particular orientation of the upper or lower side of the fixture is required on a door so long as all doors in a stack have the same fixture orientation, that is with fixtures at both ends being oriented in the same direction or in opposite directions.

Doors to be serviced by my invention must be of the same length to allow stacking by my fixtures in a vertical interconnecting array. Normally most doors generally and especially those in a single construction project are of the same length and most are of similar symmetrical configuration to alleviate any problems with fixture alignment.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and

What I claim is:

1. A fixture, to be fastened on the top and bottom edges of a door to allow a plurality of horizontally orientated doors of similar length carrying the fixtures to be manipulated thereby and stacked in vertically spaced relationship, comprising in combination:

an elongate body having an inner face for placement in adjacency to the edge of a door and an outer face distal therefrom joined by an upper side edge and a lower side edge extending between the inner and outer surfaces, said body having a medial portion interconnecting two similar end portions each having means for fastening to the edge of a door, and a width between the upper and lower edges greater than the thickness of a door to which the fixture is to be attached;

handle means carried by each end portion of the body to extend outwardly from the outer surface thereof; and aligning fasteners having cooperating mortises and tenons carried by each end portion of the body, with the tenons on each end portion on one body edge and the mortises on the end portion of the opposed body edge to allow vertical stacking of a plurality of fixtures for positional maintenance relative to each other.

2. The fixture of claim 1 further having at least one fastening foot carried by the inner surface of each end portion of the body to extend spacedly inwardly from the inner surface of the body to communicate with a door to carry serviced by the fixture to provide a surface of smaller area than the inner surface of the body.

3. The fixture of claim 2 wherein the fastening means comprise at least one hole extending through each end portion of the body between the inner and outer surface and through each fastening foot to accept a headed screw to extend therethrough and into fastenable engagement with the edge of a door to interconnect the fixture and door.

* * * * *